(12) United States Patent
Iwabuchi

(10) Patent No.: US 6,455,857 B1
(45) Date of Patent: *Sep. 24, 2002

(54) RADIATION IMAGE DETECTING SYSTEM

(75) Inventor: Yasuo Iwabuchi, Kanagawa-ken (JP)

(73) Assignee: Fuli Photo Film Co., Ltd., Kangawa-Ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/383,206

(22) Filed: Aug. 26, 1999

(30) Foreign Application Priority Data

Aug. 26, 1998 (JP) ............................................ 10-240563

(51) Int. Cl.$^7$ .............................. G01T 1/16; G01T 1/20; G01T 1/24
(52) U.S. Cl. ............................ 250/370.01; 250/370.11; 250/591
(58) Field of Search .................................. 250/591, 581, 250/582, 584, 370.01, 370.08, 370.09, 370.11, 370.14; 257/428

(56) References Cited

U.S. PATENT DOCUMENTS

| | | | |
|---|---|---|---|
| 4,803,359 A | | 2/1989 | Hosoi et al. |
| 5,187,369 A | | 2/1993 | Kingsley et al. ........ 250/370.11 |
| 5,332,909 A | * | 7/1994 | Ishiwata et al. ............ 250/584 |
| 5,753,921 A | * | 5/1998 | Trauernicht et al. ... 250/370.09 |
| 5,886,353 A | * | 3/1999 | Spivey et al. ........... 250/370.09 |
| 5,912,942 A | * | 6/1999 | Schick et al. .............. 378/98.8 |
| 6,229,877 B1 | * | 5/2001 | Agano ........................ 378/154 |
| 6,266,614 B1 | * | 7/2001 | Imai ............................ 250/591 |

FOREIGN PATENT DOCUMENTS

| | | | |
|---|---|---|---|
| EP | 0 898 421 A2 | 2/1999 | ............ H04N/5/30 |
| JP | 1-216290 | 8/1989 | ............. G01T/1/24 |
| JP | 2-164067 | 6/1990 | ......... H01L/27/146 |

OTHER PUBLICATIONS

"Signal, noise, and read out condiserations in the development of amorphous silicon photodiode arrays for radiotherapy and diagnostic x–ray imaging" L.E. Antonuk et al., Universtiy of Michigan, R.A. Street Xerox, PARC, SPIE vol. 1443 Medical Imaging V: Image Physics (1991), pp. 108–119.

"Material Parameters in Thick Hydrogenated Amorphous Silicon Radiation Detectors", Qureshi et al.; Lawrence Berkeley Laboratory, University of CA,. pp. 1–4.

"Metal/Amorphous Silicon Multilayer Radiation Detectors", IEE Transactions on Nuclear Science, Naruse et al., vol. 36, No. 2, Apr., 1989.

* cited by examiner

*Primary Examiner*—Constantine Hannaher
*Assistant Examiner*—Albert Gagliardi
(74) *Attorney, Agent, or Firm*—Sughrue Mion, PLLC

(57) ABSTRACT

A radiation image detecting system includes a solid radiation detector formed of a first conductive layer which is transparent to recording radiations, a recording photoconductive layer which exhibits photoconductivity upon exposure to the recording radiations passing through the first conductive layer, a charge transfer layer which acts substantially as an insulator to electric charges of the same polarity as that in which the first conductive layer is charged and as a conductor to electric charges reverse to that in which the first conductive layer is charged, a read-out photoconductive layer which exhibits photoconductivity upon exposure to read-out electromagnetic waves, and a second conductive layer which is transparent to the read-out electromagnetic waves. These layers are superposed one on another in this order. A radiation absorbing member which is formed of material absorbent of the recording radiations is provided on the second conductive layer side of the solid radiation detector.

18 Claims, 4 Drawing Sheets

RADIATION IMAGE DETECTING SYSTEM

BACKGROUND OF THE INVENTION

1. Field of the Invention

This invention relates to a radiation image detecting system, and more particularly to suppression of deterioration in image quality due to backscattering of radiations and/or protection of a latent image charge detecting circuit against the radiations in a radiation image detecting system.

2. Description of the Related Art

There has been known a radiation image information read-out system using radiographic film or a stimulable phosphor sheet in medical radiography.

Recently there has been proposed a radiation image detecting system employing a solid radiation detector including a semiconductor as a major part which detects radiations and converts the intensity of radiations to an electric signal. Though various types of solid radiation detectors have been proposed, the following solid radiation detectors are representative.

That is, a solid radiation detector comprising a two-dimensional image reader formed by two-dimensionally forming a plurality of photoelectric conversion elements (each forming a picture element) on an insulating substrate and a phosphor layer (scintillator) which is formed on the two-dimensional image reader and generates visible light bearing thereon image information when exposed to radiations bearing thereon image information. The solid radiation detector of this type will be referred to as "a photo-conversion type solid radiation detector", hereinbelow.

A solid radiation detector comprising a two-dimensional image reader formed by two-dimensionally forming a plurality of charge collection electrodes (each forming a picture element) on an insulating substrate and a radiation-conductive material layer which is formed on the two-dimensional image reader and generates electric charges bearing thereon image information when exposed to radiations bearing thereon image information. The solid radiation detector of this type will be referred to as "a direct conversion type solid radiation detector", hereinbelow.

The photo-conversion type solid radiation detectors are disclosed, for instance, in Japanese Unexamined Patent Publication Nos. 59(1984)-211263 and 2(1990)-164067, PCT International Publication No. WO92/06501, "Signal, noise, and read out considerations in the development of amorphous silicon photodiode arrays for radiography and diagnostic x-ray imaging", L. E. Antonuk et. al., University of Michigan, R.A. street Xerox, PARC, SPIE vol. 1443, "Medical Imaging V", Image Physics (1991), pp. 108–119, and the like.

In the photo-conversion type solid radiation detector, the photoelectric conversion elements have also function of storing detected electric charges, and the electric charges obtained by photoelectric conversion are stored in the photoelectric conversion elements as latent image charges.

As the direct conversion type solid radiation detector, the following have been proposed.

1) A solid radiation detector which is about ten times as large as normal solid radiation detectors in thickness as measured in the direction in which radiations are transmitted through the solid radiation detector. See "MATERIAL PARAMETERS IN THICK HYDROGENATED AMORPHOUS SILICON RADIATION DETECTORS", Lawrence Berkeley Laboratory. University of California, Berkeley, Calif. 94720 Xerox Parc. Palo Alto. Calif. 94304.

2) Those comprising a plurality of solid radiation detectors laminated in the direction in which radiations are transmitted with metal plates intervening therebetween. See "Metal/Amorphous Silicon Multilayer Radiation Detectors", IEE TRANSACTIONS ON-NUCLEAR SCIENCE. VOL. 36. NO.2 APRIL 1989.

3) Solid radiation detectors using CdTe and the like disclosed in Japanese Unexamined Patent Publication No. 1(1989)-216290.

In the direct conversion type solid radiation detector, a capacitor is connected to each of the charge collection electrodes and the electric charges collected by the charge collection electrodes are stored in the capacitors as latent image charges.

This applicant has proposed an improvement on the direct conversion type solid radiation detector as disclosed in Japanese Patent Application 9(1997)-222114. The solid radiation detector will be referred to as "an improved direct conversion type solid radiation detector", hereinbelow.

The improved direct conversion type solid radiation detector comprises a first conductive layer which is transparent to recording radiations, a recording photoconductive layer which exhibits photoconductivity upon exposure to the recording radiations passing through the first conductive layer, a charge transfer layer which acts substantially as an insulator to electric charges of the same polarity as that in which the first conductive layer is charged and as a conductor to electric charges reverse to that in which the first conductive layer is charged, a read-out photoconductive layer which exhibits photoconductivity upon exposure to read-out electromagnetic waves, and a second conductive layer which is transparent to the read-out electromagnetic waves. These layers are superposed one on another in this order and latent image charges are collected on the interface between the recording photoconductive layer and the charge transfer layer.

As a system for reading out the latent image charges in the improved direct conversion type solid radiation detector, there may be employed a read-out system where the read-out electrode (the second conductive layer) is made like a flat plate and the latent image charges are read out by scanning the read-out electrode with a read-out light spot such as a laser beam, or a read-out system where the read-out electrode is made like a stripe electrode (comb tooth electrode) and the latent image charges are read out by scanning the stripe electrode with a line light beam, extending in a direction perpendicular to the longitudinal direction of the stripe electrode, in the longitudinal direction of the stripe electrode. Irrespective of whichever read-out system is employed, the solid radiation detector forms a two-dimensional image read-out system in which a plurality of detecting elements (each forming a picture element) formed by the charge transfer layer, the read-out photoconductive layer and the second conductive layer are two-dimensionally arranged.

In any one of the solid radiation detectors described above, a detecting circuit which converts the latent image charges to an image signal is connected to the solid radiation detector. The detecting circuit converts the latent image charges stored on the photoelectric conversion elements, the charge collection electrodes or the detecting elements to an image signal, and the image signal is output after subjected to a predetermined image processing, and is reproduced as a visible image by a reproducing system such as a CRT.

In radiography employing such a solid radiation detector, radiations which have passed through an object and bear thereon transmission radiation image information of the object are caused to impinge upon the solid radiation detector, and the radiations are converted to latent image charges bearing thereon the transmission radiation image information of the object in the solid radiation detector, and the latent image charges are stored in the solid radiation detector. Thereafter the latent image charges in the solid radiation detector is converted to an image signal by a detecting circuit and the image signal is output.

Not all the radiations impinging upon the solid radiation detector are converted to the latent image charges but a part of the radiations passes through the solid radiation detector and impinges upon substance behind the solid radiation detector. The radiations reflected by the substance behind the solid radiation detector reenter the solid radiation detector from rearward as backscattering radiations bearing thereon image information on the substance and are converted to latent image charges bearing image information on the substance.

As a result, the solid radiation detector stores both the latent image charges representing the image information on the substance behind the solid radiation detector and the latent image charges representing the transmission radiation image information on the object. Accordingly, the image signal finally output from the detecting circuit includes components representing the image information on the substance behind the solid radiation detector, which deteriorates quality of the image.

Further the detecting circuit is generally formed by an integrated circuit integrally with the solid radiation detector. When the detecting circuit is exposed to the radiations during taking a radiation image, components of the detecting circuit, for instance, amplifiers and/or memories, can malfunction and the service life of the components can be shortened.

SUMMARY OF THE INVENTION

In view of the foregoing observations and description, the primary object of the present invention is to provide a radiation image detecting system in which deterioration in image quality due to backscattering of radiations can be suppressed.

Another object of the present invention is to provide a radiation image detecting system in which components of the detecting circuit cannot malfunction and the service life of the components cannot be shortened due to exposure to the radiations during taking a radiation image.

The radiation image detecting system in accordance with the present invention is characterized in that a radiation absorbing member is provided on the side of the solid radiation detector remote from the recording radiation source so that the recording radiation is absorbed by the radiation absorbing member and no backscattering radiation is generated.

That is, in accordance with a first aspect of the present invention, there is provided a radiation image detecting system comprising a solid radiation detector (of the improved direct conversion type) comprising a first conductive layer which is transparent to recording radiations, a recording photoconductive layer which exhibits photoconductivity upon exposure to the recording radiations passing through the first conductive layer, a charge transfer layer which acts substantially as an insulator to electric charges of the same polarity as that in which the first conductive layer is charged and as a conductor to electric charges reverse to that in which the first conductive layer is charged, a read-out photoconductive layer which exhibits photoconductivity upon exposure to read-out electromagnetic waves, and a second conductive layer which is transparent to the read-out electromagnetic waves, which layers are superposed one on another in this order, and a radiation absorbing member which is formed of material absorbent of the recording radiations and is provided on the second conductive layer side of the solid radiation detector.

It is preferred that the radiation image detecting system be provided with a detecting circuit which is provided on the side of the radiation absorbing member remote from the solid radiation detector and detects latent image charges collected on the interface between the recording photoconductive layer and the charge transfer layer.

In accordance with a second aspect of the present invention, there is provided a radiation image detecting system comprising a solid radiation detector (of the direct conversion type) comprising a two-dimensional image reader formed by two-dimensionally forming a plurality of charge collection electrodes, each forming a picture element, on an insulating substrate and a radiation-conductive material layer which is formed on the two-dimensional image reader and generates electric charges bearing thereon image information when exposed to radiations bearing thereon image information, and a radiation absorbing member which is formed of material absorbent of the radiations and is provided on the insulating substrate side of the solid radiation detector.

It is preferred that the radiation image detecting system be provided with a detecting circuit which is provided on the side of the radiation absorbing member remote from the solid radiation detector and detects charges collected by the charge collection electrodes.

In accordance with a third aspect of the present invention, there is provided a radiation image detecting system comprising a solid radiation detector (of the photo-conversion type) comprising a two-dimensional image reader formed by two-dimensionally forming a plurality of photoelectric conversion elements, each forming a picture element, on an insulating substrate and a phosphor layer which is formed on the two-dimensional image reader and generates visible light bearing thereon image information when exposed to radiations bearing thereon image information, and a radiation absorbing member which is formed of material absorbent of the radiations and is provided on the insulating substrate side of the solid radiation detector.

It is preferred that the radiation image detecting system be provided with a detecting circuit which is provided on the side of the radiation absorbing member remote from the solid radiation detector and detects electric charges obtained by photoelectric conversion by the photoelectric conversion elements.

Preferably the radiation absorbing member is 0.1 mm to 10 mm in thickness and more preferably is 0.2 mm to 1.0 mm in thickness.

In the radiation image detecting system of the present invention, the radiation absorbing member reduces the backscattering radiations and accordingly deterioration in image quality due to the backscattering radiations can be suppressed, whereby a high quality image relatively free from influence of the backscattering radiations can be obtained.

Further when the detecting circuit is disposed behind the radiation absorbing member, the detecting circuit is protected from radiations and malfunction and/or reduction in service life of the detecting circuit can be prevented.

DESCRIPTION OF THE PREFERRED EMBODIMENTS

Figure 1:
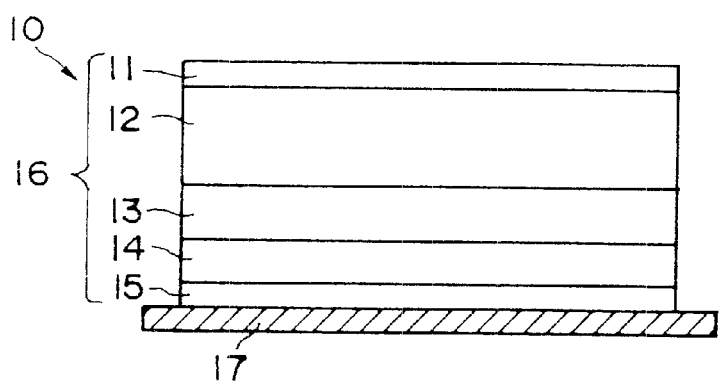
FIG. 1 is a schematic cross-sectional view of a radiation image detecting system in accordance with a first embodiment of the present invention where an improved direct conversion type solid radiation detector is employed.

In FIG. 1, a radiation image detecting system 10 in accordance with a first embodiment of the present invention comprises an improved direct conversion type solid radiation detector 16 comprising a first conductive layer 11 which is transparent to recording radiations, a recording photoconductive layer 12 which exhibits photoconductivity upon exposure to the recording radiations passing through the first conductive layer 11, a charge transfer layer 13 which acts substantially as an insulator to electric charges of the same polarity as that in which the first conductive layer 11 is charged and as a conductor to electric charges reverse to that in which the first conductive layer 11 is charged, a read-out photoconductive layer 14 which exhibits photoconductivity upon exposure to read-out electromagnetic waves, and a second conductive layer 15 which is transparent to the read-out electromagnetic waves, which layers are superposed one on another in this order, a radiation absorbing member 17 which is formed of material absorbent of the recording radiations and is provided on the second conductive layer side of the solid radiation detector 16, and a detecting circuit (not shown in FIG. 1 and will be described later) which detects latent image charges collected on the interface between the recording photoconductive layer 12 and the charge transfer layer 13.

When the radiations are X-rays, for instance, a lead plate is suitable as the radiation absorbing member 17. Further it is preferred that the radiation absorbing member 17 be of such a size that it can cover over the entire area of the second conductive layer 15.

When detecting the latent image charges, it is necessary to project the read-out electromagnetic waves onto the second conductive layer 15. Accordingly when a source of the read-out electromagnetic waves (not shown) is disposed between the second conductive layer 15 and the radiation absorbing member 17, the radiation absorbing member 17 need not be removable. However when the source of the read-out electromagnetic waves is disposed outside the radiation absorbing member 17, the radiation absorbing member 17 should be removable from the solid radiation detector 16 so that the read-out electromagnetic waves can be projected onto the second conductive layer 15 without being blocked by the radiation absorbing member 17.

In order to determine how thick the radiation absorbing member 17 should be, the relation between the thickness of the radiation absorbing member 17 and the amount of backscattering radiations and the relation between the thickness and the weight of the radiation absorbing member 17 were measured.

Figure 2:
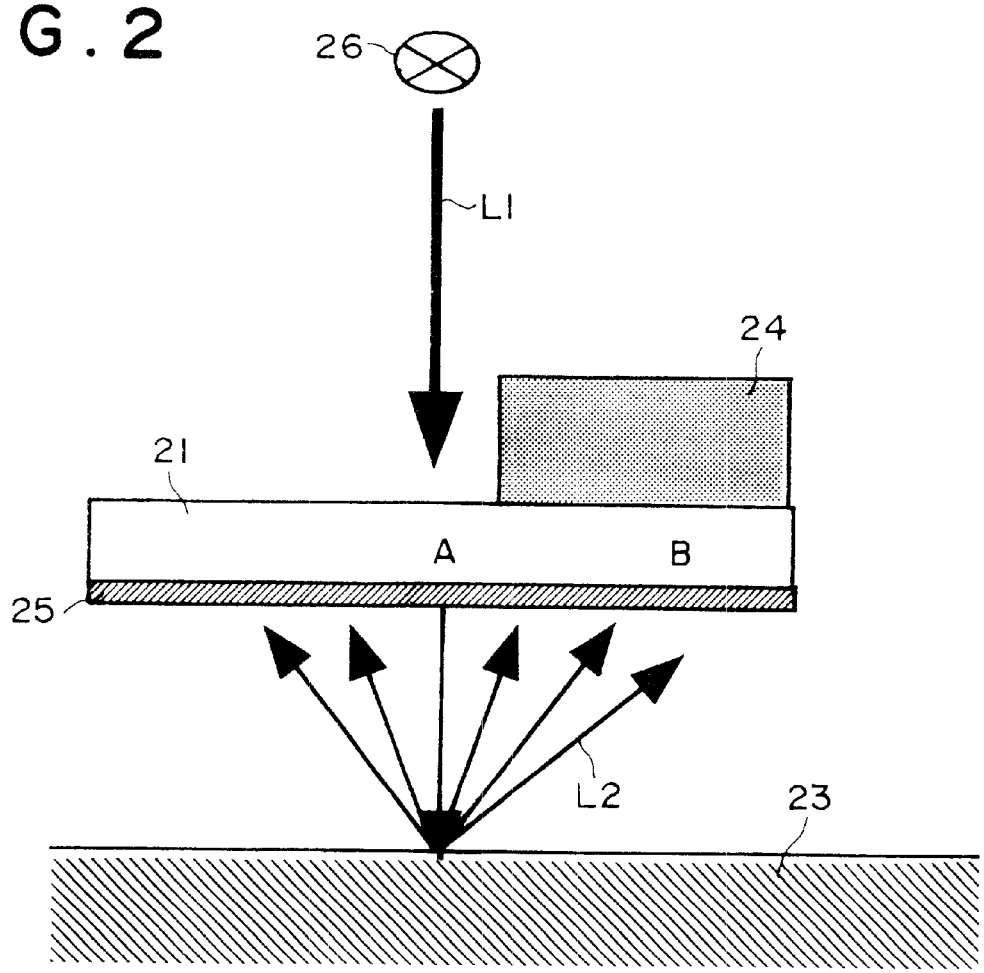
FIG. 2 is a view for illustrating the method of measuring the relation between the thickness of the radiation absorbing member and the amount of backscattering radiations.

The amount of the backscattering radiations were measured in terms of the ratio of the amount of the backscattering radiations to the amount of the radiations projected onto the solid radiation detector 16 according to the method shown in FIG. 2. That is, a solid radiation detector 21 was disposed between an X-ray source 26 and a scattering material 23 such as concrete. The right half (indicated at B) of the upper side of the solid radiation detector 21 was covered with a lead plate 24 which was sufficiently thick to absorb X-rays L1 projected from the X-ray source 26, and the entire area of the lower side of the solid radiation detector 21 was covered with a lead plate 25. A detecting circuit (not shown) connected to the solid radiation detector 21 read out latent image charges stored on the solid radiation detector 21 and output an image signal.

Figure 3:
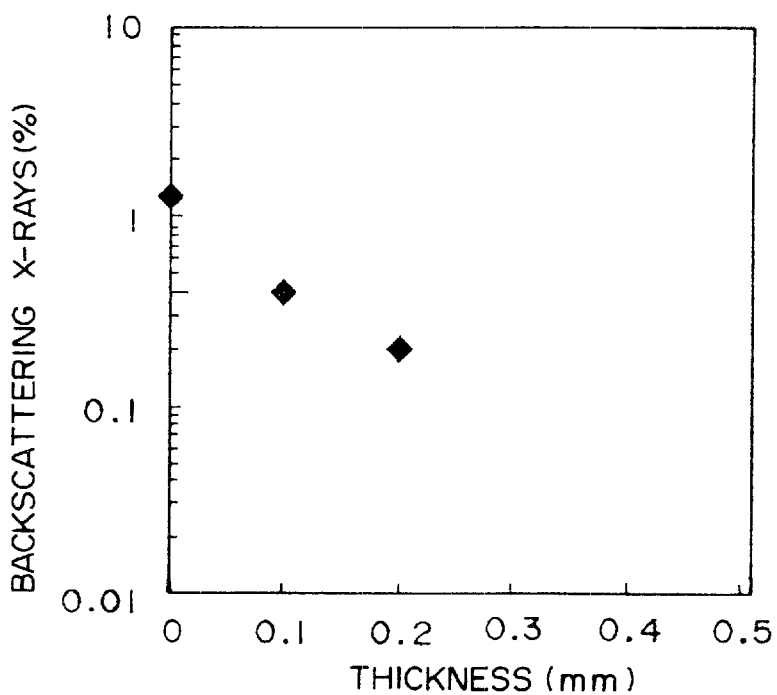
FIG. 3 is a view showing the relation between the thickness of the radiation absorbing member and the amount of backscattering radiations.

X-rays L1 at 80 KVp were projected onto the solid radiation detector 21 and the amount of the backscattering X-rays (%) were obtained as the ratio of the signal level Sb for the part B covered with the lead plate 24 to the signal level Sa for the part A not covered with the lead plate 24. Since the signal levels are considered to be proportional to the amount of X-rays L1 and/or the amount of the backscattering X-rays L2, it is expected that defining the amount of the backscattering X-rays by the ratio of the signal levels is equivalent to directly measure the amounts of the backscattering X-rays by use of an X-ray meter. In accordance with this method, the amount of backscattering X-rays were measured for various thicknesses of the lead plate 25, and the result is shown in FIG. 3. As can be seen from FIG. 3, when the lead plate 25 was 0.2 mm in thickness, the amount of the backscattering X-rays was about 0.2%, when the lead plate was 0.1mm in thickness, the amount of the backscattering X-rays was about 0.4% and without the lead plate 25, the amount of the backscattering X-rays was about 1.3%.

Further influence of the backscattering X-rays L2 on the image was observed. Specifically a test chart such as a gray scale was X-rayed, an image is displayed by a CRT on the basis of latent image charges read out from the solid radiation detector 21, and how the image on the basis of the backscattering X-rays L2 deteriorated the contrast of the image was measured. The result of this experiment revealed that deterioration in contrast became unacceptable when the amount of the backscattering X-rays as measured by the method described above was not smaller than 1%. This shows that in order to obtain proper image quality, it is necessary that the amount of the backscattering X-rays is less than 1% and accordingly the radiation absorbing member should be of such a thickness that the amount of the backscattering X-rays becomes less than 1%. As can be understood from FIG. 3, in order to make the amount of the backscattering X-rays less than 1%, the thickness of the lead plate 25 is preferably at least 0.1 mm. This is the same for a radiation absorbing member of a material other than lead.

Figure 4:
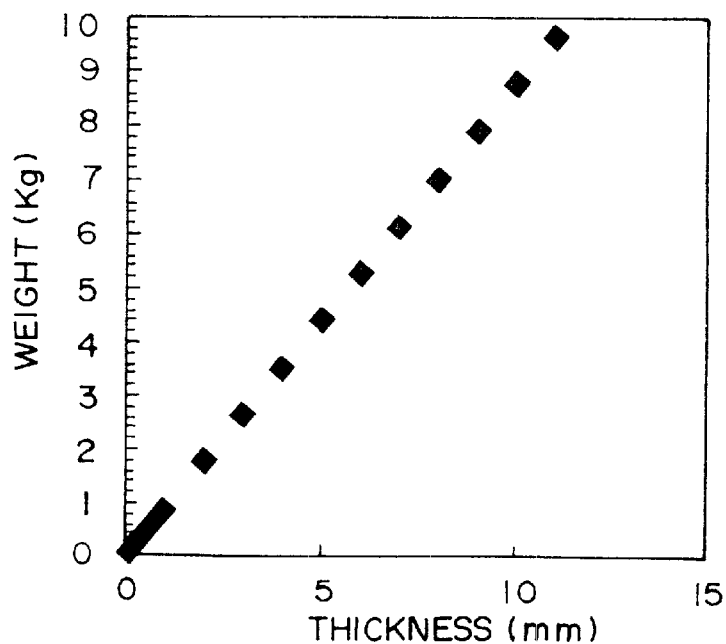
FIG. 4 is a view showing the relation between the thickness and the weight of the radiation absorbing member.

However as the thickness of the radiation absorbing member increases, the radiation absorbing member becomes heavier. In view of handleability of the radiation image detecting system, it is preferred that the radiation absorbing member be not larger than 10 Kg in weight. FIG. 4 shows the relation between the thickness and the weight of the radiation absorbing member for a quarter size radiation image detecting system which is most frequently used. As can be understood from FIG. 4, in the case of a quarter size radiation image detecting system, the thickness of the radiation absorbing member is preferably not larger than about 10 mm.

Thus, in order to suppress influence of the backscattering radiations on the image quality and improve handleability of the radiation image detecting system, preferably the thickness of the radiation absorbing member 17 is 0.1 mm to 10 mm, and more preferably 0.2 mm to 1.0 mm.

The detecting circuit which detects latent image charges collected on the interface between the recording photoconductive layer 12 and the charge transfer layer 13 may be provided integrally with the solid radiation detector 16 or separately from the solid radiation detector 16.

Figure 5A:
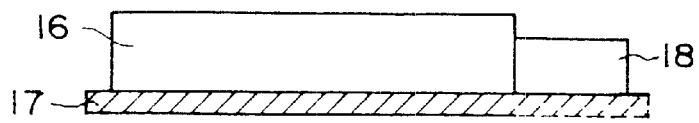
FIGS. 5A to 5C are views illustrating various arrangements of the detecting circuit.

FIG. 5A shows a detecting circuit 18 provided integrally with the solid radiation detector 16. In this case, it is preferred that the detecting circuit 18 be formed as an integrated circuit, so that the detecting circuit 18 can be produced in a single manufacturing process together with the solid radiation detector 16. The detecting circuit 18 may be disposed beside the solid radiation detector 16 separately therefrom as shown in FIG. 5B or 5C.

Figure 5B:
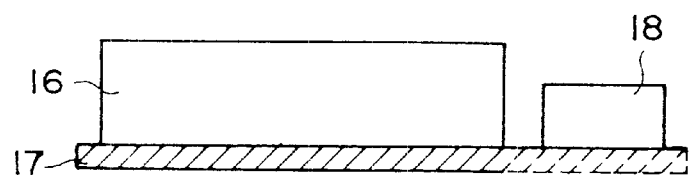
Figure 5C:
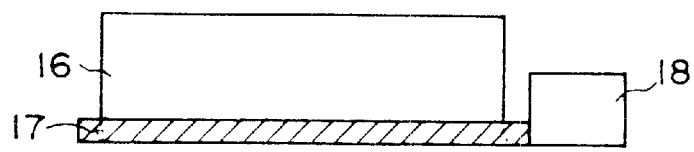

In the case of the arrangements shown in FIGS. 5A and 5B, the radiation absorbing member 17 need not cover the lower side of the detecting circuit 18 as shown by the dashed line but has only to cover the lower side of the solid radiation detector 16.

Figure 6A:
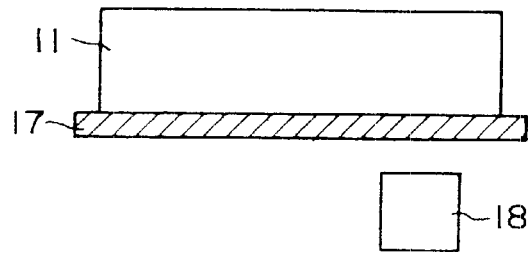
FIGS. 6A and 6B are views illustrating preferred arrangements of the detecting circuit.
Figure 6B:
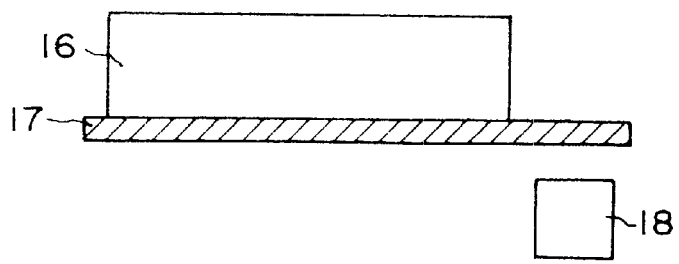

However, in order to protect the detecting circuit 18 from the recording radiations, it is preferred that the detecting circuit 18 be disposed behind the radiation absorbing member 17, that is, on the side of the radiation absorbing member 17 remote from the solid radiation detector 16 as shown in FIGS. 6A and 6B. When the detecting circuit 18 is disposed behind the radiation absorbing member 17, components of the detecting circuit 18 are protected from the recording radiations, and malfunction of the detecting circuit 18 and reduction of the service life of the detecting circuit 18 due to exposure to the radiations during taking a radiation image can be prevented.

Figure 7:
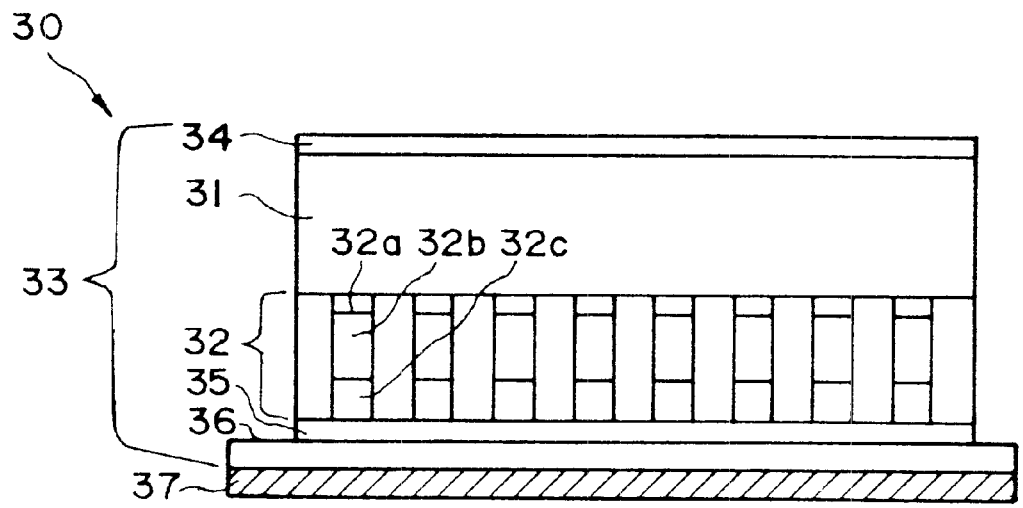
FIG. 7 is a schematic cross-sectional view of a radiation image detecting system in accordance with a second embodiment of the present invention where a direct conversion type solid radiation detector is employed.

A radiation image detecting system 30 in accordance with a second embodiment of the present invention where a direct conversion type solid radiation detector is employed will be described with reference to FIG. 7, hereinbelow.

The radiation image detecting system 30 of this embodiment comprises a direct conversion type solid radiation detector 33 comprising a two-dimensional image reader 32 formed on an insulating substrate 36 and a radiation-conductive material layer 31 which is formed on the two-dimensional image reader 32 and generates electric charges bearing thereon image information when exposed to radiations bearing thereon image information, a radiation absorbing member 37 which is formed of material absorbent of the radiations and is provided on the insulating substrate side of the solid radiation detector 33 and a detecting circuit (not shown) which detects charges collected by charge collection electrodes 32a to be described later.

The two-dimensional image reader 32 comprises a plurality of charge collection electrodes 32a which are arranged in a matrix-like fashion on the insulating substrate 36 (e.g., a 3 mm thick silica glass plate) and each of which forms a picture element, a plurality of capacitors 32b which store signal charges collected by the respective charge collection electrodes 32a as latent image charges, and a plurality of switching elements 32c such as TFTs which transfer the latent image charges stored in the capacitors 32b to the detecting circuit. A first electrode 34 is provided on the upper surface of the radiation-conductive material layer 31 and a second electrode 35 is provided between the switching elements 32c and the insulating substrate 36.

The radiation absorbing member 37 may be similar to that 17 employed in the first embodiment. In this embodiment, the radiation absorbing member 37 need not cover the entire area of the insulating substrate 36 so long as it covers the radiation-conductive material layer 31 and the two-dimensional image reader 32.

In the radiation image detecting system 30 of this embodiment where the direct conversion type solid radiation detector 33 is employed, the latent image charges stored in the capacitors 32b are detected by transferring the charges to the detecting circuit by the switching elements 32c. That is, no reading radiation source is required and accordingly, the radiation absorbing member 37 need not be removable though it may be removable if desired.

Also in this embodiment, the radiation absorbing member 37 reduces the backscattering radiations and accordingly deterioration in image quality due to the backscattering radiations can be suppressed. Further, in order to suppress influence of the backscattering radiations on the image quality and improve handleability of the radiation image detecting system, the thickness of the radiation absorbing member 17 is preferably 0.1 mm to 10 mm, and more preferably 0.2 mm to 1.0 mm.

The detecting circuit which detects the latent image charges stored in the capacitors 32c may be provided inside or outside the radiation image detecting system 30. Further the detecting circuit may be provided integrally with the solid radiation detector 33 or separately therefrom.

Further also in this embodiment, when the detecting circuit is disposed behind the radiation absorbing member 37, components of the detecting circuit are protected from the recording radiations, and malfunction of the detecting circuit and reduction of the service life of the detecting circuit due to exposure to the radiations during taking a radiation image can be prevented.

Figure 8:
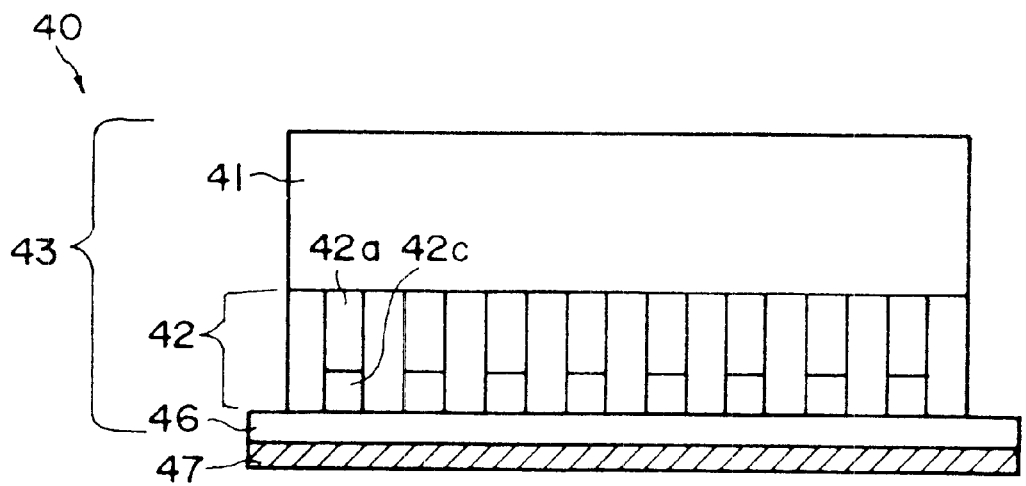
FIG. 8 is a schematic cross-sectional view of a radiation image detecting system in accordance with a third embodiment of the present invention where a photo-conversion type solid radiation detector is employed.

A radiation image detecting system 40 in accordance with a third embodiment of the present invention where a photo-conversion type solid radiation detector is employed will be described with reference to FIG. 8, hereinbelow.

The radiation image detecting system 40 of this embodiment comprises a direct conversion type solid radiation detector 43 comprising a two-dimensional image reader 42 formed on an insulating substrate 46 and a phosphor layer 41 which is formed on the two-dimensional image reader 42 and generates visible light bearing thereon image information when exposed to radiations bearing thereon image information, a radiation absorbing member 47 which is formed of material absorbent of the radiations and is provided on the insulating substrate side of the solid radiation detector 43 and a detecting circuit (not shown) which detects electric charges obtained by photoelectric conversion by photoelectric conversion elements 42a to be described later.

The two-dimensional image reader 42 comprises a plurality of photoelectric conversion elements 42*a* which are arranged in a matrix-like fashion on the insulating substrate 46 (e.g., a 3 mm thick silica glass plate) and each of which forms a picture element, and a plurality of switching elements 42*c* such as TFTs which transfer signal charges generated by photoelectric conversion by the photoelectric conversion elements 42*a* to the detecting circuit. The photoelectric conversion elements 42*a* are formed by sandwiching an amorphous semiconductor layer between a transparent conductive layer and a conductive layer. The photoelectric conversion elements 42*a* also function as capacitive elements and signal charges generated by photoelectric conversion by the photoelectric conversion elements 42*a* are stored in the photoelectric conversion elements 42*a* as latent image charges.

The radiation absorbing member 47 may be similar to that 17 employed in the first embodiment. In this embodiment, the radiation absorbing member 47 need not cover the entire area of the insulating substrate 46 so long as it covers the phosphor layer 41 and the two-dimensional image reader 42.

In the radiation image detecting system 40 of this embodiment where the photo-conversion type solid radiation detector 43 is employed, the latent image charges stored in the photoelectric conversion elements 42*a* are detected by transferring the charges to the detecting circuit by the switching elements 42*c*. That is, no reading radiation source is required and accordingly, the radiation absorbing member 47 need not be removable though it may be removable if desired.

Also in this embodiment, the radiation absorbing member 47 reduces the backscattering radiations and accordingly deterioration in image quality due to the backscattering radiations can be suppressed. Further, in order to suppress influence of the backscattering radiations on the image quality and improve handleability of the radiation image detecting system, the thickness of the radiation absorbing member 17 is preferably 0.1 mm to 10 mm, and more preferably 0.2 mm to 1.0 mm.

The detecting circuit which detects the latent image charges stored in the photoelectric conversion elements 42*a* may be provided inside or outside the radiation image detecting system 40. Further the detecting circuit may be provided integrally with the solid radiation detector 43 or separately therefrom.

Further also in this embodiment, when the detecting circuit is disposed behind the radiation absorbing member 47, components of the detecting circuit are protected from the recording radiations, and malfunction of the detecting circuit and reduction of the service life of the detecting circuit due to exposure to the radiations during taking a radiation image can be prevented.

What is claimed is:

1. A radiation image detecting system comprising:

a solid radiation detector comprising a first conductive layer which is transparent to recording radiations, a recording photoconductive layer which exhibits photoconductivity upon exposure to the recording radiations passing through the first conductive layer, a charge transfer layer which acts substantially as an insulator to electric charges of the same polarity as that in which the first conductive layer is charged and as a conductor to electric charges reverse to that in which the first conductive layer is charged, a read-out photoconductive layer which exhibits photoconductivity upon exposure to read-out electromagnetic waves, and a second conductive layer which is transparent to the read-out electromagnetic waves, which layers are superposed one on another in this order, and a radiation absorbing member which is formed of material absorbent of the recording radiations, such that an amount of backscattering radiation is less than 1%, and is provided on the second conductive layer side of the solid radiation detector.

2. A radiation image detecting system as defined in claim 1 further comprising a detecting circuit which is provided on the side of the radiation absorbing member remote from the solid radiation detector and detects latent image charges collected on the interface between the recording photoconductive layer and the charge transfer layer.

3. A radiation image detecting system as defined in claim 1 in which the radiation absorbing member is 0.1 mm to 10 mm thickness.

4. A radiation image detecting system as defined in claim 3 in which the radiation absorbing member is 0.2 mm to 1.0 mm thickness.

5. The system of claim 1, wherein the radiation absorbing member comprises a physically discrete layer connected in said system.

6. The system of claim 5, wherein the radiation absorbing member has a planar surface area that is larger than a planar surface area of the second conductive layer.

7. A radiation image detecting system comprising:

a solid radiation detector comprising a two-dimensional image reader formed by two-dimensionally forming a plurality of charge collection electrodes, each forming a picture element, on an insulating substrate and a radiation-conductive material layer which is formed on the two-dimensional image reader and generates electric charges bearing thereon image information when exposed to radiations bearing thereon image information, and a radiation absorbing member which is formed of material absorbent of the radiations, such that an amount of backscattering radiation is less than 1%, and is provided on the insulating substrate side of the solid radiation detector.

8. A radiation image detecting system as defined in claim 7 further comprising a detecting circuit which is provide on the side of the radiation absorbing member remote from the solid radiation detector and detects charges collected by the charge collection electrodes.

9. A radiation image detecting system as defined in claim 7 in which the radiation absorbing member is 0.1 mm to 10 mm in thickness.

10. A radiation image detecting system as defined in claim 9 in which the radiation absorbing member is 0.2 mm to 1.0 mm in thickness.

11. The system of claim 7, wherein the radiation absorbing member comprises a physically discrete layer connected in said system.

12. The system of claim 11, wherein the radiation absorbing member has a planar surface area that is larger than a planar surface area of the two-dimensional image reader.

13. A radiation image detecting system comprising:

a solid radiation detector comprising a two-dimensional image reader formed by two-dimensionally forming a plurality of photoelectric conversion elements, each forming a picture element, on an insulating substrate and a phosphor layer which is formed on the two-dimensional image reader and generates visible light bearing thereon image information when exposed to radiations bearing thereon image information, and a radiation absorbing member which is formed of material absorbent of the radiations, such that an amount of backscattering radiation is less than 1%, and is provided on the insulating substrate side of the solid radiation detector.

14. A radiation image detecting system as defined in claim 13 further comprising a detecting circuit which is provide on the side of the radiation absorbing member remote from the solid radiation detector and detects electric charges obtained by photoelectric conversion by the photoelectric conversion elements.

15. A radiation image detecting system as defined in claim 13 in which the radiation absorbing member is 0.1 mm to 10 mm in thickness.

16. A radiation image detecting system as defined in claim 15 in which the radiation absorbing member is 0.2 mm to 1.0 mm in thickness.

17. The system of claim 13, wherein the radiation absorbing member comprises a physically discrete layer connected in said system.

18. The system of claim 17, wherein the radiation absorbing member has a planar surface area that is larger than a planar surface area of the two-dimensional image reader.

* * * * *